(12) United States Patent
Morita et al.

(10) Patent No.: US 7,626,718 B2
(45) Date of Patent: Dec. 1, 2009

(54) FUNCTION CONVERTING APPARATUS AND FUNCTION CONVERTING METHOD

(75) Inventors: Masao Morita, Ebina (JP); Atsushi Kitagawara, Ebina (JP); Masaru Okutsu, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 843 days.

(21) Appl. No.: 11/223,011

(22) Filed: Sep. 12, 2005

(65) Prior Publication Data

US 2006/0215199 A1 Sep. 28, 2006

(30) Foreign Application Priority Data

Mar. 25, 2005 (JP) ............................. 2005-090186

(51) Int. Cl.
*G06F 15/00* (2006.01)
*G06F 3/00* (2006.01)

(52) U.S. Cl. ...................................... 358/1.15; 719/321

(58) Field of Classification Search ................. 358/1.14, 358/1.15, 1.16, 435, 1.12, 400; 719/321, 719/327; 709/203, 208, 217, 221; 715/201, 715/209, 274, 961; 370/254, 328, 349, 381
See application file for complete search history.

(56) References Cited

U.S. PATENT DOCUMENTS 6,148,346 A * 11/2000 Hanson ...................... 719/321

FOREIGN PATENT DOCUMENTS

JP A 11-212749 8/1999

* cited by examiner

*Primary Examiner*—Saeid Ebrahimi Dehkordy
(74) *Attorney, Agent, or Firm*—Oliff & Berridge, PLC (57) ABSTRACT

A function converting method has storing correspondence-information between operating system function information and device function information, converting a function of an operating system into a function of an equipment driver based on the correspondence-information, and controlling so that the converted function is executed by the equipment driver.

14 Claims, 5 Drawing Sheets

60A
```
GRAPHIC DRAWING (VERSION 1)
1: SHAPE
2: COLOR
3: FILLING ATTRIBUTE TYPE <OVERPRINT>
4: FILLING ATTRIBUTE NUMERICAL VALUE
```

60B
```
GRAPHIC DRAWING (VERSION 1)
1 : @1
2 : @2
3 : @3
4 : @4
```

FIG. 4B

62A
```
GRAPHIC DRAWING (VERSION 2)
1: SHAPE
2: COLOR
3: FILLING ATTRIBUTE TYPE <TRANSMISSIVE>
4: FILLING ATTRIBUTE NUMERICAL VALUE
```

62B
```
GRAPHIC DRAWING (VERSION 1)
1 : @1
2 : COLOR CORRECTION <@2,PATTERN <@4>>
3 : FILLING ATTRIBUTE TYPE <OVERPRINT>
4 : !@
```

FIG. 4C

64A
```
GRAPHIC DRAWING (VERSION 1)
1: SHAPE
2: PATTERN (COLOR, PATTERN RATE)
3: FILLING ATTRIBUTE TYPE <OVERPRINT>
4: FILLING ATTRIBUTE NUMERICAL VALUE
```

64B
```
GRAPHIC DRAWING (VERSION 2)
1 : @1
2 : @2 (@1)
3 : FILLING ATTRIBUTE TYPE <TRANSMISSIVE>
4 : @2 (@2)
```

FIG. 4D

66A
```
GRAPHIC DRAWING (VERSION 1)
1: SHAPE
2: COLOR
3: FILLING ATTRIBUTE TYPE <OVERPRINT>
4: FILLING ATTRIBUTE NUMERICAL VALUE
```

66B
```
GRAPHIC DRAWING (VERSION 2)
1 : @1
2 : @2
3 : @3
4 : @4
5 : SECURITY <OFF>
```

FUNCTION CONVERTING APPARATUS AND FUNCTION CONVERTING METHOD

CROSS REFERENCE TO RELATED APPLICATION

This application claims priority under 35USC119 from Japanese Patent Application No. 2005-090186, the disclosure of which is incorporated by reference herein.

BACKGROUND OF THE INVENTION

1. Field of the Invention

The present invention relates to a function converting apparatus generating data for outputting to a device, a function converting method, a storage medium storing a function converting program, a device data generating apparatus, a device data generating method, and a storage medium storing a device data generating program.

2. Description of the Related Art

Conventionally, when print is executed by an image forming apparatus such as a printer or like equipment, a personal computer (hereinafter, refer to PC) connected to the image forming apparatus generates device data described by a language such as a page description language (PDL) or the like, which can be interpreted by the image forming apparatus executing the print, and outputs this data to the image forming apparatus (for example, refer to Japanese Patent Application Laid-Open (JP-A) No. 11-212749). Based on printing data, generated by an application according to a version of operating system installed on a PC, the technique of JP-A No. 11-212749 generates device data, using a printer driver, which can be interpreted by a printer corresponding to this printer driver, the printer driver being compatible with the same operating system version. In other words, the technique of JP-A No. 11-212749 converts a single data format defined by the operating system into a single data format defined by the device.

In general, if a new function is added, such as with a new Application Program Interface being added to the operating system (hereinafter, referred to as OS) during a version upgrade of the OS of the above PC, it is necessary to change the device driver so as to make it compatible with the new API function.

However, a problem is generated in that it is impossible to use the function corresponding to the new API, from an old application compatible with the functions of the OS before adding the new function. On the contrary, it is also hard to use only the functions corresponding to the old API from the new application corresponding to the OS after adding the new function. In other words, there is generated a problem that an unconformity is generated between the functions which the OS can provide and the associated functions of devices, such as image forming apparatuses or the like, due to the addition of the new function to the OS or the like.

SUMMARY

A function converting method has storing correspondence-information between operating system function information and device function information, converting a function of an operating system into a function of an equipment driver based on the correspondence-information, and controlling so that the converted function is executed by the equipment driver.

BRIEF DESCRIPTION OF THE DRAWINGS

Embodiments of the present invention will be described in detail based on the following figures, wherein.

DETAILED DESCRIPTION OF THE INVENTION

A description will be given of an embodiment in accordance with the present invention with reference to the accompanying drawings.

Figure 1:
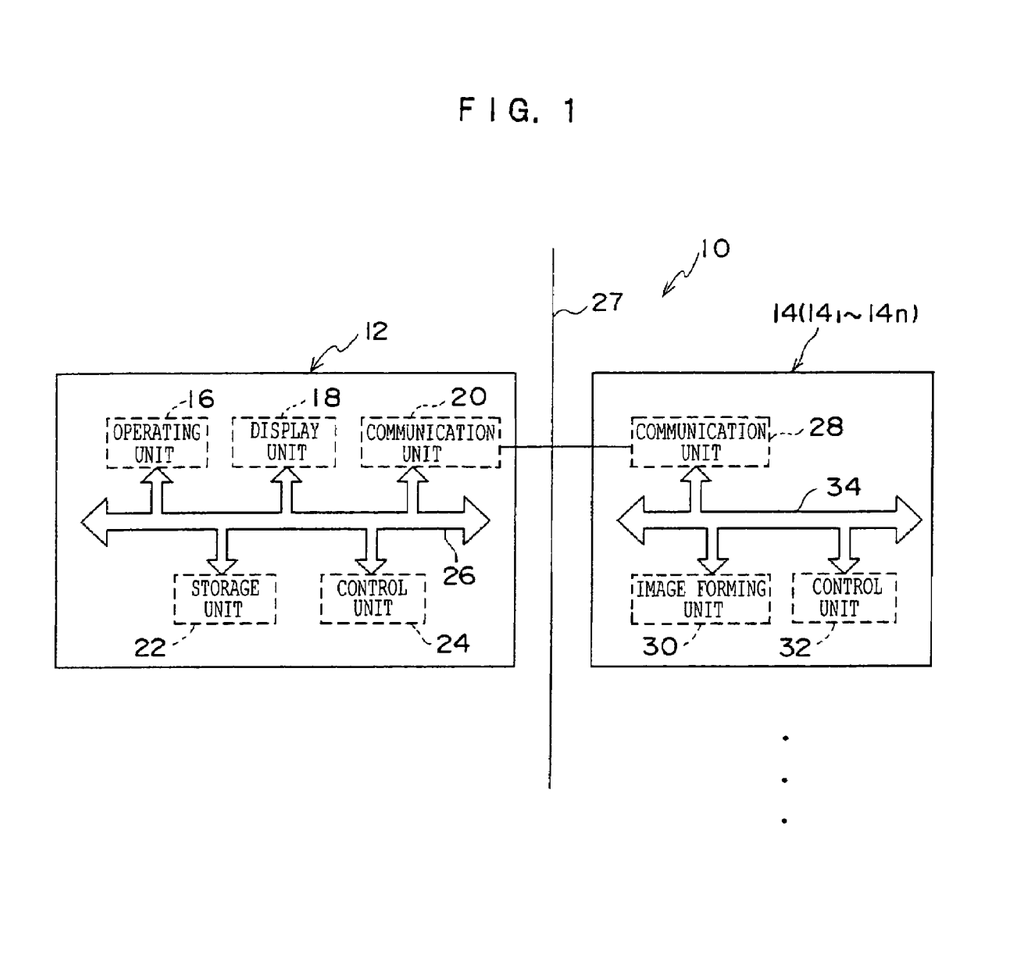
FIG. 1 is a diagram showing a schematic structure of a printing system in accordance with an embodiment of the invention.

FIG. 1 is a block diagram showing a structure of a printing system 10 including a personal computer (hereinafter, referred to as a PC) to which a function converting apparatus and a device data generating apparatus in accordance with the invention can be applied.

The printing system 10 is constituted by a PC 12, and printers 14₁ to 14ₙ corresponding to at least one image forming apparatus. The PC 12 and the printers 14₁ to 14ₙ are connected via a network 27 so as to be able to receive and send data and commands.

The PC 12 is mainly structured such as to include: a storage unit 22, for storing various data; an operating unit 16, for inputting various commands by a user; a display unit 18, for displaying various information; a communicating unit 20, for receiving and sending data with respect to at least one printer 14₁ to 14ₙ via the network 27; a ROM, for storing in advance various processing routines described below (refer to FIG. 3) and various data; and a control unit 24, for controlling the operation of respective units constituting the PC 12. The communicating unit 20, the display unit 18, the operating unit 16, the storage unit 22 and the control unit 24 are connected via a bus 26, such as a data bus, an address bus or the like, so as to be able to receive and send data and commands.

Each of the printers 14₁ to 14ₙ is provided with: a communicating unit 28, for sending and receiving data to and from the PC 12, via the network 27; a control unit 32, for controlling the operation of respective units constituting the printer(s) 14; and an image forming unit 30, which, based on control of the control unit 32, analyzes device data input from the PC 12 and executes output based on the device data. The communicating unit 28, the image forming unit 30 and the control unit 32 are connected via a bus 34 so as to be able receive and send data and commands between each other. In the present embodiment, in order to simplify description, an explanation will be made based on the assumption that two printers, a printer $14_1$ and a printer $14_2$, are connected to the network 27 so as to freely send and receive the data to and from the PC 12. However, three or more printers may be connected to the network 27, and the number of printers is not limited to two.

Figure 2:
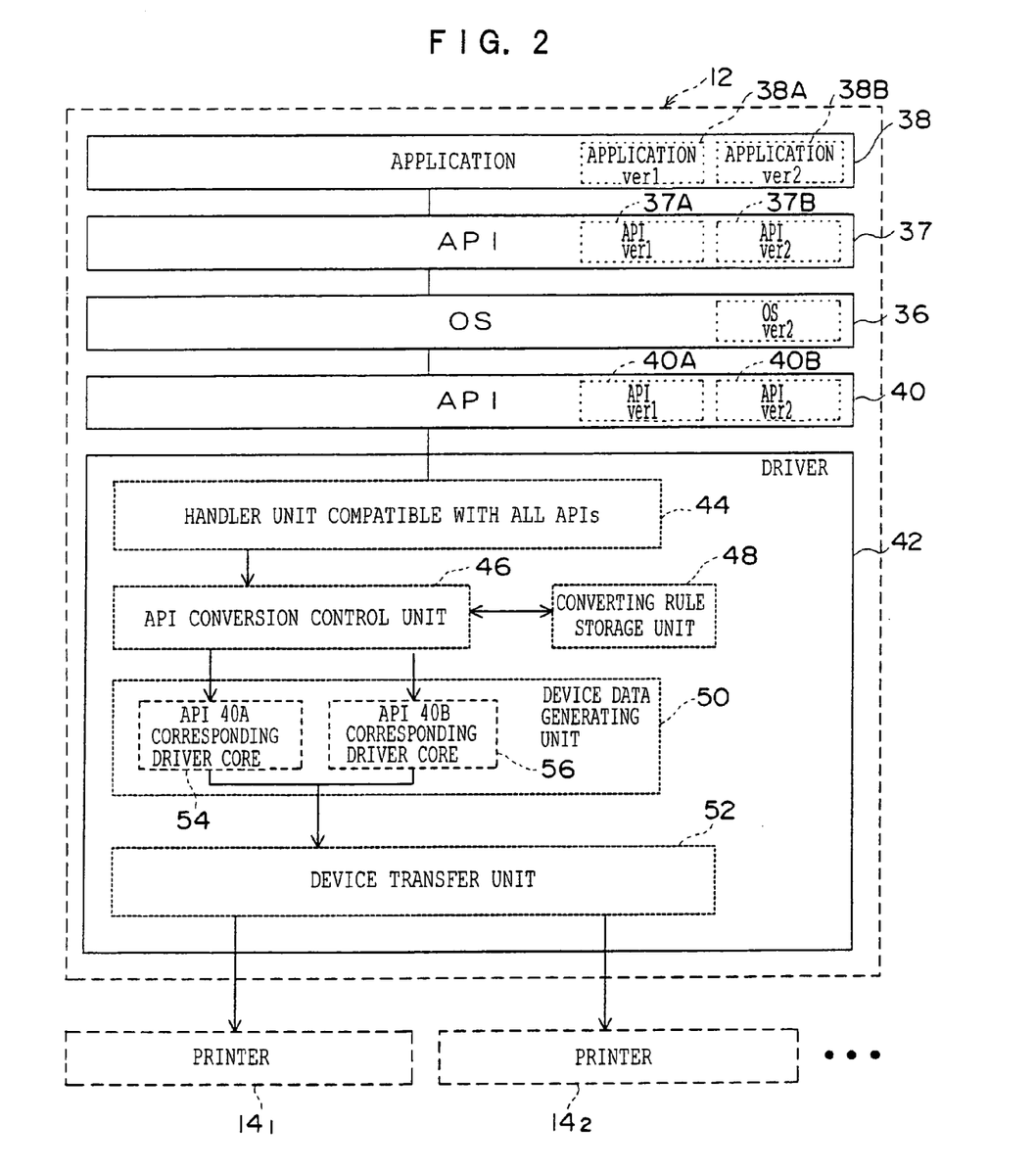
FIG. 2 is a schematic view showing a software structure of a personal computer in accordance with the embodiment of the invention.

A software structure of the PC 12 in accordance with the present embodiment is provided with an operating system 36 (hereinafter, referred to as OS 36), as shown in FIG. 2, and various applications 38 are operated on the OS 36. In this case, the OS 36 can employ a generally widely used general-purpose OS, for example, WINDOWS, UNIX, Linux and the like. Further, the application 38 is exemplified by document creation software, spreadsheet software, and the like, operating on the general-purpose OS. In this case, in the present embodiment, a description will be given based on the assumption that, as a result of a change, the OS 36 version is upgraded, with the old version being version 1, and the latest version of OS 36 being version 2, and the PC 12 is installed with version 2 of OS 36, however, versions are not limited to versions 1 and 2.

In the present embodiment, a description will be given on the assumption that there are various applications 38 installed in advance on the PC 12, and that of these, application 38A corresponds to the old version (version 1 in the present embodiment), and application 38B correspond to the new version (version 2 in the present embodiment).

The OS 36 is, schematically, configured so as to include: application programming interfaces (APIs) 37, for utilizing the functions of the OS 36 from each of the applications 38A and the applications 38B; and APIs 40, for calling up the respective functions of the printer $14_1$ and the printer $14_2$. Further, a printer driver 42, for generating print data which can be interpreted by the printers $14_1$ to $14_n$, is loaded on the PC 12.

The versions of APIs 37 and APIs 40 are upgraded along with the version upgrade of the OS 36, in the same manner as the applications 38.

In the present embodiment, a description will be given based on the assumption that an API 37A corresponding to the old version of the OS 36 and an API 37B corresponding to the new version of the OS 36 are loaded as the APIs 37. In the same manner, a description will be given on the assumption that an API 40A corresponding to the old version of the OS 36 and an API 40B corresponding to the new version of the OS 36 are loaded as the APIs 40.

The printer driver 42 stores printer information, representing each of at least one printers $14_1$ to $14_n$, and version information, representing the version of the OS 36 corresponding to each of the printer information, in a corresponding manner. The printer driver 42 is configured to include handler unit 44 that is compatible with all APIs, a conversion rule storage unit 48, an API conversion control unit 46, a device data generating unit 50 and a device transfer unit 52.

The all API compatible handler unit 44 is a functional unit for calling up the API 40A or the API 40B prescribed by the OS 36. The conversion rule storage unit 48 is a functional unit for storing in advance conversion rules for converting the functions corresponding to each version of the APIs 40 into the functions corresponding to other versions of the APIs 40. In the present embodiment, the functional unit stores in advance conversion rules for converting the functions defined in the API 40A into the functions defined in the API 40B, or converting the functions defined in the API 40B into the functions defined in the API 40A.

In the conversion rule storage unit 48, there is stored as conversion rules in a coordinated/corresponding manner: function information of the API 40A or API 40B before conversion, for calling up the functions of each of the printers $14_1$ and $14_2$; and, function information of the API 40A or the API 40B after the conversion. In other words, the function information is coordinated in such a manner that the functions of one version of API 40 can be converted into the functions of a different version of API 40.

Version information, which expresses the version of the corresponding API 40A or API 40B, is stored together with each item of the function information.

In the present embodiment, corresponding to each of these items of function information is stored in advance, in a coordinated manner, either: command-execution conversion information, instructing the conversion of a function; or, command-non-execution conversion information, instructing that the conversion of the function is not executed. That is, conversion information expressing whether or not the conversion of a function is instructed.

In this case, in the present embodiment, a description will be given based on the assumption that in the conversion rule storage unit 48 it is function information of the API 40A or API 40B before conversion, which is for calling up the functions of each of the printer $14_1$ and the printer $14_2$, and function information of the API 40A or API 40B after conversion, which are stored as the conversion rules in a coordinated manner. However, it is equally possible that for the function information before conversion the function information of the APIs 37, which is for utilizing the functions of the OS 36 from each of the applications 38A and 38B, may be stored in a coordinated manner.

Further, in the present embodiment, a description will be given based on the assumption that the function information of the API 40A or the API 40B before conversion, which is for calling up the function of each of the printers $14_1$ and $14_2$, and the function information of the API 40A or the API 40B after the conversion are stored as the conversion rules in a coordinated manner in the conversion rule storage unit 48. However, command function information of the API 40A or the API 40B before conversion, which is for calling up the function of each of the printers $14_1$ and $14_2$, and command function information of the API 40A or the API 40B after the conversion, may be stored as the conversion rules in a coordinated manner in the conversion rule storing unit 48.

The device data generating unit 50 is a functional unit for generating device data described by a language such as a page description language (PDL) or the like which can be interpreted by each of the printers $14_1$ to $14_n$. The device transfer unit 52 is a functional unit for transferring the device data generated by the device data generating unit 50 to each of the corresponding printers $14_1$ to $14_n$.

The device data generating unit 50 is configured to include: an API 40A compatible driver core unit 54, corresponding to the API 40A; and an API 40B compatible driver core unit 56, corresponding to the API 40B. The API 40A compatible driver core unit 54 is a functional unit for generating device data which can be interpreted by the printer $14_1$, when selected with a print command by a user. The device data is generated from the print data prepared by an application 38, based on the functions of the API 40A after the functions have been converted by the API conversion control unit 46. The API 40B compatible driver core unit 56 is a functional unit for generating device data which can be interpreted by the printer 142 when selected with a print command by the user. The device data is generated from the print data prepared by an application 38, based on the functions of the API 40B after the functions are converted by the API conversion control unit 46.

A description will be given below of a process executed by the control unit 24 of the PC 12 in accordance with the invention with reference to FIG. 3.

Figure 3:
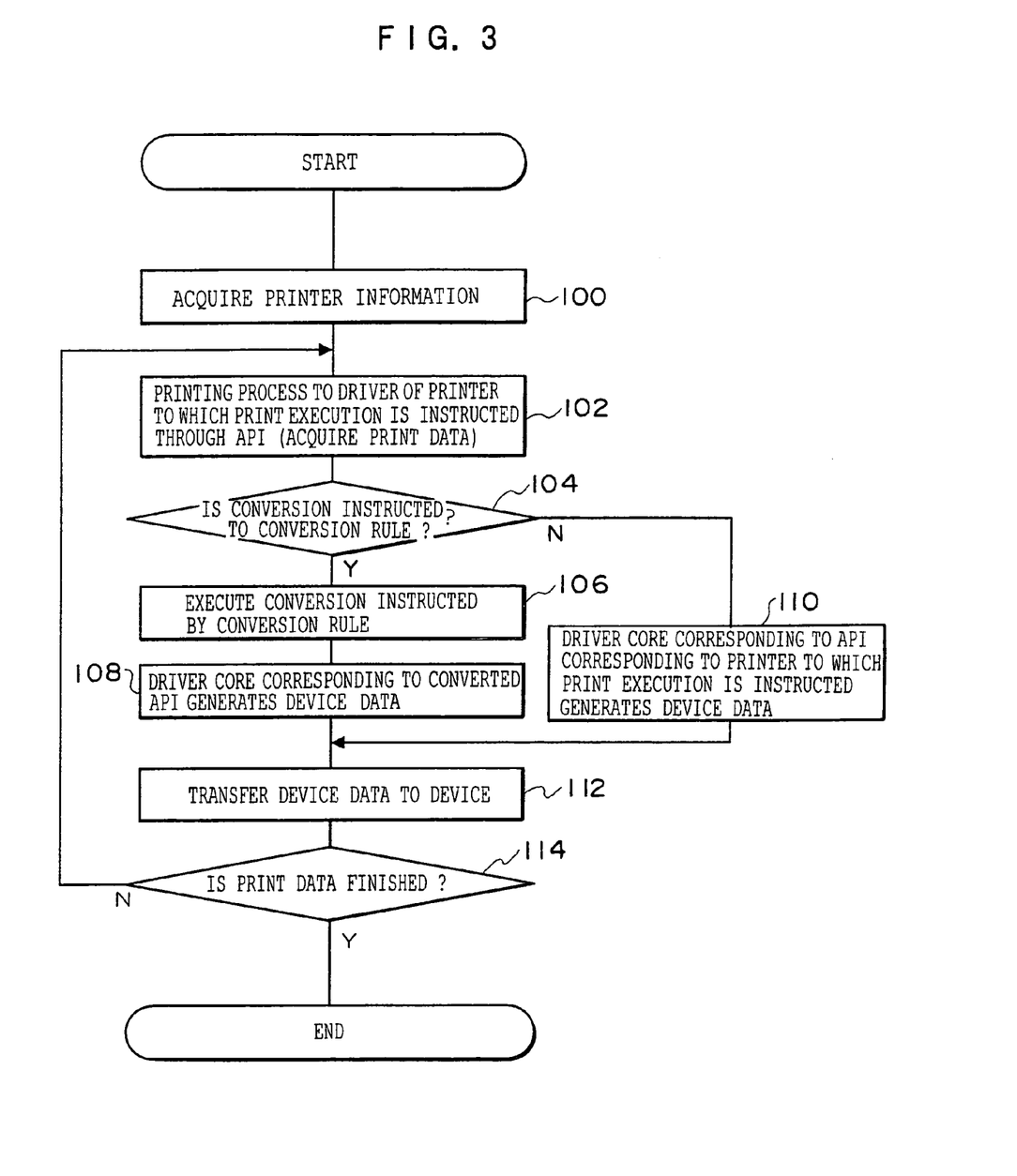
FIG. 3 is a flow chart showing processes executed by a control unit of the personal computer in accordance with the present embodiment.

When one of the applications 38, from the applications 38A and 38B installed in the PC 12, is started in accordance with an operation command of the user by the operating unit 16, and the print executing command of the print data prepared via the application 38 is given, a processing routine shown in FIG. 3 is executed, proceeding to step 100 where the printer information representing the printer for outputting the data is input, and then proceeding to a step 102.

For example, in the step 100, printer information representing the printer $14_2$ can be input for outputting the print data prepared by the application 38A, corresponding to the old version of the OS 36, from the printer $14_2$ that corresponds to the new version of the OS 36. Further, for example, in the step 100, printer information expressing the printer $14_1$ can be input for outputting print data prepared by the application 38B, corresponding to the new version of the OS 36, from the printer $14_1$ that corresponds to the old version of the OS 36.

The next step 102 executes a start command of the API 40 corresponding to the printer 14 to which the print executing command is applied in the step 100 mentioned above, and acquires the print data from the application 38.

For example, in the step 102, in the case that the application 38B, corresponding to the new version of the OS 36 is used for generating the print data, the API 40B corresponding to the new version is started. Further, in the case that the application 38A corresponding to the old version of the OS 36 is used for generating the print data, the API 40A corresponding to the old version is started.

The next step 104 searches the API 40 started in step 102 mentioned above within the conversion rule storage unit 48, and determines whether or not the version information of the API 40 started in step 102 mentioned above matches the version information of the API 37 corresponding to the application 38 to which the print execution command is applied in step 100 mentioned above. In the case that the version of the API 37 matches the version of the API 40, the procedure goes to step 110, and in the case that they do not match, the procedure goes to step 106.

It may be configured such that further associated with the conversion rules stored in the conversion rule storage unit 48 is command conversion information, and this is coordinated to the functions of the API 40 before conversion, which include the version information of the API 37 corresponding to the application 38 to which the print execution command is applied in step 100 mentioned above, and the functions of the API 40 after the conversion, which include the version information of the API 40 started in step 102 mentioned above. In this case, in the determination in step 104, if command-execution conversion information is associated then the procedure proceeds to step 106, and in the case that command-non-execution conversion information is associated, the procedure proceeds to step 110.

The step 106 converts the functions of the API 40 of the same version as that of the API 37 corresponding to the application 38 preparing the print data, into the functions of the API 40 corresponding to the printer 14 designated by the printer information acquired in the step 100 mentioned above, based on the conversion rules stored in the conversion rule storage unit 48.

In detail, in the case that the version of the API 37 corresponding to the application 38 preparing the print data is the new version, and the version of the API 40 corresponding to the printer 14 of the printer information acquired in step 100 mentioned above is the old version, on the basis of the process of step 106, the functions of the API 40A of the old version are converted into the functions of the API 40B of the new version.

On the contrary, when the version of the API 37 corresponding to the application 38 preparing the print data is the old version, and the version of the API 40 corresponding to the printer 14 of the printer information acquired in step 100 mentioned above is the new version, on the basis of the process of step 106, the functions of the API 40B of the new version are converted into the functions of the API 40A of the old version.

For example, in the case that a "transmissive" attribute is supported in the functions of the new version API 40B, and the transmissive attribute is not supported in the function of the old version API 40A, the functions of the API 40 are converted so as to form an apparent transmission function, giving the appearance of trasmissive printing.

Figure 4A:
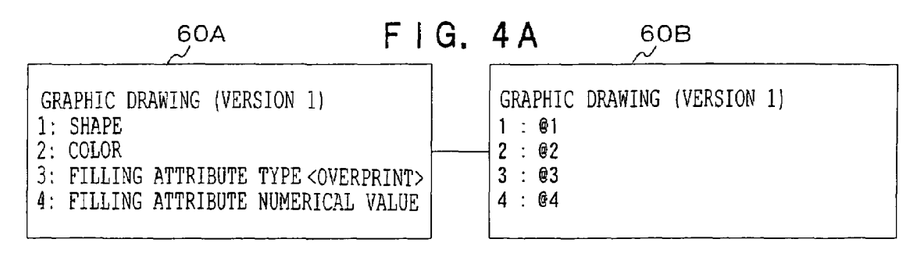
FIG. 4A is a schematic view showing a function converting rule of an API in the case that a function conversion is not executed.
Figure 4B:
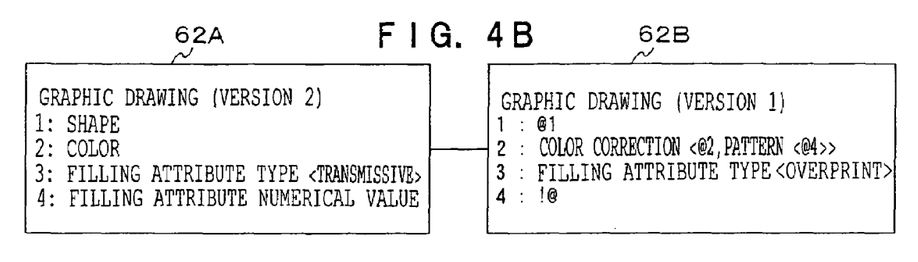
FIG. 4B is a schematic view showing the function converting rule of the API in the case that a function of the API of a version 2 is converted into a function of the API of a version 1.

In particular, when converting the functions of the API 40B into the functions of the API 40A, function conversion is executed by converting a graphic drawing function 62A into a graphic drawing function 62B, as shown in FIG. 4B. In detail, the data expressing the shape is not changed, and the color is changed to a pattern density based on a fill attribute value with reference to a color attribute before conversion (@2) and reference to a fill attribute value before conversion (@4), as shown in the graphic drawing function 62B. Further, the type of fill attribute <transmission> is changed to fill attribute type <overprint>, and the numerical value of the fill attribute is replaced by a constant (!@).

In the case of the executing the conversion mentioned above, for example, in the case that "blue" is set for the color attribute in the attribute of the drawing function 62A expressing the functions of the API 40B, in which <transmissive> is set for the fill attribute, and "50%" is set as the numerical value of the fill attribute, then <overprint> is set for the fill attribute when converted into the functions of the API 40A, and the attribute is expressed by a pattern with a color attribute as 50% of "blue".

Figure 5A:
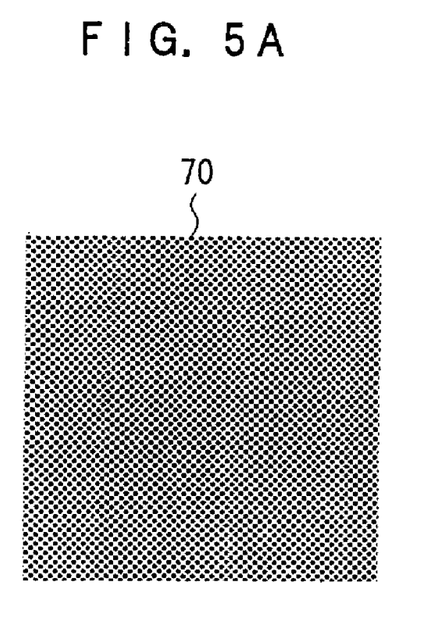
FIG. 5A is an image view showing a drawing using the function of the API of an old version.
Figure 5B:
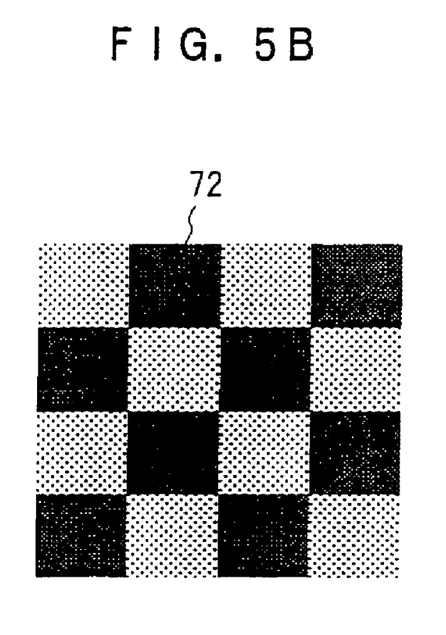
FIG. 5B is an image view showing a drawing using the function of the API of a new version.

For example, if the printing is executed from the printer $14_2$, which corresponds to the API 40B using the API 40 having the transmissive attribute, the output image forms the blue image drawn at a transmission factor of 50% as shown by an image 70, as shown in FIG. 5A. On the other hand, if the printing is executed from the printer corresponding to the API 40A having no transmission attribute by using the API 40B having the transmission attribute, the output image forms a blue image 72 drawn by a blue checkered pattern, as shown in FIG. 5B.

Figure 4C:
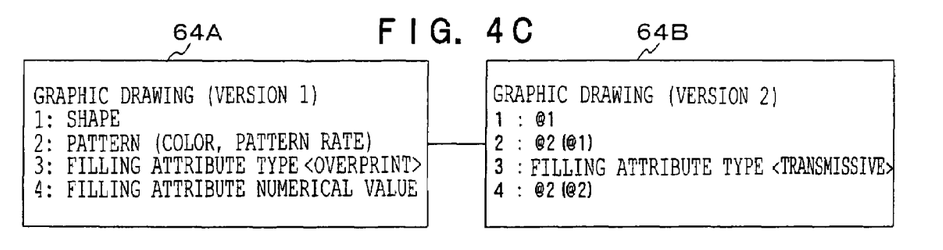
FIG. 4C is a schematic view showing the function converting rule of the API in the case that a function of the API of the version 1 is converted into a function of the API of the version 2.

On the other hand, as shown in FIG. 4C, when converting the functions of the API 40A (the old version) into the functions of the API 40B (the new version), a graphic drawing function 64A is converted into a graphic drawing function 64B. In detail, the data expressing the shape is not changed, the color of the pattern and the pattern rate are not changed, <overprint> of the fill attribute kind is converted into <transmissive>, and the information expressing the pattern rate is defined as the numerical value of the fill attribute.

As mentioned above, it is possible to convert the functions of the old version API 40A into the functions of the new version API 40B, convert the functions of the new version API 40B of the new version into the functions of the old version API 40A, and convert the functions of APIs 40 between respective versions.

In this case, if a function or attribute, which is not included in the functions of the old version API 40A but is included in the functions of the new version API 40B, it is preferable to store in advance within the printer driver 42 a correspondence table representing the functions which are not included in the functions of the API 40A of the version 1, but are included in the functions of the API 40B of the version 2. Further, for example, in the case of converting the API 40A of the version 1 into the API 40B of the version 2, it is possible to carry out conversion by adding the missing functions.

Figure 4D:
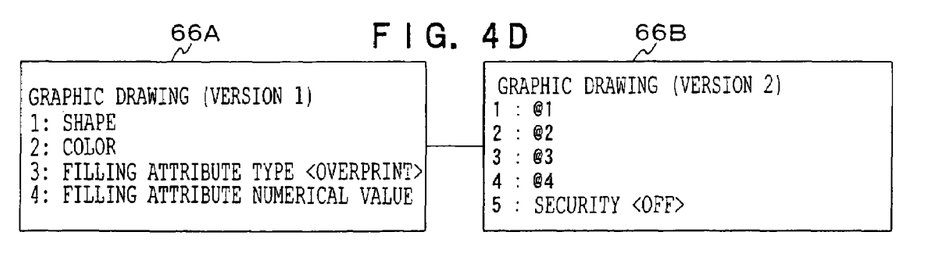
FIG. 4D is a schematic view showing the function converting rule of the API in accordance with an aspect different from FIG. 4C in the case that a function of the API of the version 1 is converted into a function of the API of the version 2.

In particular, as shown in FIG. 4D, it is possible to convert a graphic drawing function 66A of the API 40A into a graphic drawing function 66B of the API 40B by adding an attribute of a security attribute to the graphic drawing function 66A of the API 40A. In this case, as opposed to the above, when converting the API 40B of the version 2 into the API 40A of the version 1, it is preferable to convert the functions of the API 40B into the functions of the API 40A by deleting the functions of API 40B which are not included in the API 40A.

The next step 108 starts the driver core that corresponds to the version of the API 40 corresponding to the printer selected by the printer information acquired in step 100 above (either a driver core 54 corresponding to the API 40A or a driver core 56 corresponding to the API 40B). After generating the device data, which the selected printer indicated by the printer information acquired in step 100 can interpret, using the started driver core and based on the functions of the API 40A or API 40B converted in accordance with the process of step 106 above, the procedure proceeds to step 112.

However if the determination in step 104 is affirmative, the procedure proceeds to step 110, and the driver core corresponding to the API 40 of the printer indicated by the printer information acquired in step 100 above (either the driver core 54 corresponding to the API 40A or the driver core 56 corresponding to the API 40B). After generating the device data, which the selected printer of the printer information acquired by step 100 above can interpret, using the started driver core and based on the functions of the API 40, the procedure proceeds to step 112.

For example, in accordance with the process of step 110 above, as shown in FIG. 4A, when a graphic drawing function 60A is defined as the API 40A, and the shape, the color, the fill attribute type <overprint> and the numerical value of the fill attribute are defined as attributes of the function, the version description within the drawing function 60A is equal to the version description within the drawing function 60B, as shown by the graphic drawing function 60B. Accordingly, the device data which the printer indicated by the printer information acquired in step 100 above can interpret is generated by using the attribute defined by the drawing function 60A as it is, without conversion.

The next step 112 outputs the device data generated in step 108 or step 110 to the printer 14$_1$ or the printer 14$_2$ according to the printer information acquired in step 100 mentioned above.

The next step 114 determines whether or not all the printing data is processed, and in the case that the print data is left, the procedure goes back to step 102 and the process is continued. If it is determined that all the print data is processed, the present routine is finished.

As described above, in accordance with the present embodiment, if the version of the OS 36 corresponding to the printer instructed for outputting the print data is the same as the version of the OS 36 corresponding to the application program preparing the print data, then the device data, which can be interpreted by the printer instructed from the print data prepared by the application, is generated on the basis of the functions of the API 40 corresponding to the printer outputting the instructed print data. On the other hand, if the version of the OS 36 corresponding to the printer outputting the instructed print data is different from the version of the OS 36 corresponding to the application program preparing the print data, then it is possible to convert the functions of an API 40 that corresponds to the version information associated with the application program generating the print data, into the functions of an API 40 corresponding to the printer to which the output is instructed, and to generate the device data, which can be interpreted by the printer, based on the print data.

In particular, when the version of the API 40 corresponding to the printer to which the print is instructed, is different from the version of the API 37 corresponding to the application which instructs the print execution, it is possible to convert the functions of the API 40 of the same version as the version of the API 37 corresponding to the application in which the print execution is instructed, in such a manner as to obtain the functions of the API 40 of the version of the API 40 corresponding to the printer to which the print is instructed, to generate device data on the basis of the converted functions, and to generate device data which can be interpreted by the printer to which the print is instructed so as to output to the printer to which the print is instructed.

Accordingly, even in the case that the version of the OS corresponding to the application program generating the print data is different from the version of the OS corresponding to the output printer, it is possible to generate the device data on the basis of the functions relating to the output of the device data provided in the output printer, in a versatile manner.

Further, since by one printer driver it is possible to generate the device data on the basis of the functions relating to the output of the device data provided in the printer to which the print is instructed, based on print data prepared by applications of different versions, it is possible to provide a versatile printer driver.

In this case, simplicity of explanation, a description has been given of the present embodiment based on the assumption that there are the version of OS 36 is upgraded two times, the old version and the new version, and respective corresponding application 38, API 37, API 40 and printer 14 are provided with two kinds of the old version (the version 1) and the new version (the version 2) in accordance with the history of the version upgrading of the OS 36. However, the invention is not limited to two kinds of OS, and plural kinds of applications 38, API 37, API 40 and printer 14 may be provided on the basis of the versions in correspondence to the history of the version upgrading of the OS 36. In this case, even when the version of the operating system corresponding to the application program generating the image data is different from the version of the operating system corresponding to the printer outputting the print data, it is possible to generate the device data based on the functions relating to the output of the device data provided in the printer outputting the device data in a versatile manner, by executing the same process as shown in FIG. 3 mentioned above.

According to an aspect of the invention, there is provided a function converting apparatus. The function converting apparatus comprises: storage means that stores correspondence-information for making correspondences between operating system function information, which includes predetermined functions of an operating system and types of operating system, and device function information, which represents equipment driver functions relating to the predetermined functions and types of equipment driver; converting means that, at a time when a predetermined function of an operating system and an equipment driver are specified, converts the predetermined function of the specified operating system into the specified function for an equipment driver on the basis of the type of the operating system of the correspondence-information and the type of the specified equipment driver; and executing means that controls so that the converted function is executed by the specified equipment driver.

According to another aspect of the invention, there is provided a function converting apparatus. The function converting apparatus comprises: storage means that stores correspondence-information for making correspondences between operating system function information, representing sets of function commands relating to predetermined functions of an operating system and types of the operating system, and device function information, which represents sets of equipment driver function commands relating to the predetermined functions and types of equipment driver; converting means that, at a time when a predetermined function of an operating system and an equipment driver are specified, converts a function command relating to the specified function of the operating system into a function command relating to the specified equipment driver on the basis of the type of the operating system of the correspondence-information and the type of the specified equipment driver; and transmitting means that transmits the converted function command to the specified equipment driver.

According to another aspect of the invention, there is provided a function converting apparatus. The function converting apparatus comprises: storage means that stores correspondence-information making correspondences between operating system function information, which includes predetermined functions of an operating system utilized by applications operating on the operating system and types of the operating system, and device function information, which represents equipment driver functions relating to the predetermined functions and types of the equipment driver; converting means that, at a time when a predetermined function of an operating system and an equipment driver are specified, converts the specified predetermined function of the operating system into a function of the specified equipment driver on the basis of the type of the operating system of the correspondence-information and the type of the specified equipment driver; and executing means that controls so that the converted function is executed by the specified equipment driver.

According to another aspect of the invention, there is provided a device data generating apparatus. The device data generating apparatus comprises: storage means that stores in advance operating function information, representing functions relating to device data output of an operating system and versions thereof, and image forming apparatus function information, representing functions relating to device data output of image forming apparatuses and versions thereof, after making correspondences between the operating system function information and the image forming apparatus function information; converting means that converts, at a time when an image forming apparatus is selected by an application on the operating system and print execution is instructed, the operating system device data output functions into the image forming apparatus device data output functions of the selected image forming apparatus on the basis of correspondence-information stored in a storage means; and generating means that generates device data interpretable by the image forming apparatus on the basis of the function information converted by the converting means.

According to another aspect of the invention, there is provided a function converting method in a computer. The function converting method comprises: storing correspondence-information which makes correspondences between operating system function information, which includes predetermined functions of an operating system and types of the operating system, and device function information, representing functions of an equipment driver relating to the predetermined functions and types of the equipment driver; converting, at a time when a predetermined function of the operating system and an equipment driver are specified, the predetermined functions of the specified operating system into the functions of the specified equipment driver, on the basis of the type of the operating system of the correspondence-information and the type of the specified equipment driver; and controlling so that the converted function is executed by the specified equipment driver.

According to another aspect of the invention, there is provided a function converting method in a computer comprises: storing correspondence-information which makes correspondences between operating system function information, representing function command sets relating to predetermined functions of an operating system and a type of the operating system, and device function information, representing function command sets of an equipment driver relating to the predetermined function and a type of the equipment driver; converting, at a time when the predetermined function of the operating system and the equipment driver are specified, the function command of the specified operating system into the function command of the specified equipment driver on the basis of the type of the operating system of the correspondence-information and the type of the specified equipment driver; and transmitting the converted function command to the specified equipment driver.

According to another aspect of the invention, there is provided a function converting method in a computer. The function converting method comprises: storing correspondence-information which makes correspondences between operating system function information, which includes predetermined functions of an operating system utilized by applications operating on the operating system and a type of the operating system, and device function information, representing functions of an equipment driver relating to the predetermined functions and a type of the equipment driver; converting, at a time when a predetermined function of the operating system and an equipment driver are specified, the predetermined functions of the specified operating system into the functions of the specified equipment driver on the basis of the type of the operating system of the correspondence-information and the type of the specified equipment driver; and controlling so that the converted function is executed by the specified equipment driver.

According to another aspect of the invention, there is provided a device data generating method. The device data generating method comprises: storing in advance operating function information, which represents functions relating to output of device data of an operating system and a version thereof, and image forming apparatus function information, which represents functions relating to output of device data of an image forming apparatus and a version thereof after making correspondences between the operating function information and the image forming apparatus function information; converting, at a time when an image forming apparatus is selected by an application on the operating system and print execution is instructed, the operating system device data output functions into the selected image forming apparatus device data output functions on the basis of correspondence-information stored in a storage means; and generating the device data interpretable by the image forming apparatus on the basis of the converted device data output function information.

According to another aspect of the invention, there is provided a storage medium readable by a computer. The storage medium storing a program of instructions is executable by the computer to perform an operation. The operation comprises: storing correspondence-information which make correspondences between operating system function information, which includes predetermined functions of an operating system and a type of the operating system, and device function information, which represents functions of an equipment driver relating to the predetermined functions and a type of the equipment driver; converting, at a time when a predetermined function of the operating system and an equipment driver are specified, the predetermined functions of the specified operating system into the functions of the specified equipment driver on the basis of the type of the operating system of the correspondence-information and the type of the specified equipment driver; and controlling so that the converted function is executed by the specified equipment driver.

According to another aspect of the invention, there is provided a storage medium readable by a computer. The storage medium storing a program of instructions is executable by the computer to perform an operation. The operation comprises: storing correspondence-information making correspondences between operating system function information, representing function command sets relating to predetermined functions of an operating system and a type of the operating system, and device function information, which represents function command sets of an equipment driver relating to the predetermined functions and a type of the equipment driver; converting, at a time when a predetermined function of the operating system and an equipment driver are specified, the function command of the specified operating system into the function command of the specified equipment driver on the basis of the type of the operating system of the correspondence-information and the type of the specified equipment driver; and transmitting the converted command function to the specified equipment driver.

According to another aspect of the invention, there is provided a storage medium readable by a computer. The storage medium storing a program of instructions is executable by the computer to perform an operation. The operation comprises: storing correspondence-information which makes correspondences between operating system function information, which includes predetermined functions of an operating system utilized by an application operating on the operating system and a type of the operating system, and device function information, which represents functions of an equipment driver relating to the predetermined functions and a type of the equipment driver; converting, at a time when a predetermined function of the operating system and the equipment driver are specified, the specified predetermined function of the operating system into the function of the specified equipment driver on the basis of the type of the operating system of the correspondence-information and the type of the specified equipment driver; and controlling so that the converted function is executed by the specified equipment driver.

According to another aspect of the invention, there is provided a storage medium readable by a computer. The storage medium storing a program of instructions is executable by the computer to perform an operation. The operation comprises: storing in advance operating function information representing functions relating to device data of an operating system and a version thereof, and image forming apparatus function information representing functions relating to output of device data of an image forming apparatus and a version thereof, after making correspondences between the operating function information and the image forming apparatus function information; converting, at a time when an image forming apparatus is selected by an application on the operating system and print execution is instructed, the operating system device data output functions into the selected image forming apparatus device data output functions on the basis of correspondence-information stored in a storage means; and generating the device data interpretable by the image forming apparatus on the basis of the converted device data output function information.

In the present embodiment, description is given of a case that one driver is provided in the PC 12, and the device data is generated so as to be output to the printer serving as the image forming apparatus, however, it may be configured so that various equipment different from the image forming apparatus is connected to the PC 12 so as to be able to receive and send the data and the signal, and device data is generated by one driver for each of the various items of equipment so as to output to the various equipment.

What is claimed is:

1. A function converting apparatus comprising:
a storage that stores correspondence-information for making correspondences between operating system function information and device function information, the operating system function information having a predetermined function of an operating system and a type of the operating system, the device function information having a function of an equipment driver and a type of the equipment driver, the function of the equipment driver being related to the predetermined function of the operating system;
a converting unit that converts the predetermined function of the operating system to correspond to a specific version of an application programming interface so that the converting unit can convert the function of the equipment driver to correspond to the specific version of the application programming interface; and
an executing unit that controls so that the converted function is executed by the equipment driver.

2. The function converting apparatus according to claim 1, wherein the type is a version of the operating system, architecture of the operating system, or architecture of CPU.

3. The function converting apparatus according to claim 1, wherein a set of function commands relating to the predetermined function of the operating system is included in the operating system function information as the predetermined function of the operating system, and a set of equipment driver function commands relating to the predetermined function is included in the device function information as the function of the equipment driver, the converting unit converts a function command relating to the function of the operating system into a function command relating to the equipment driver on the basis of the correspondence-information.

4. The function converting apparatus according to claim 3, the apparatus further comprising:
a transmitting unit that transmits the converted function command to the equipment driver.

5. The function converting apparatus according to claim 1, wherein the predetermined function of the operating system is utilized by an application operated on an operating system.

6. A device data generating apparatus comprising:
a storage that stores correspondence-information for making correspondences between operating system function information and image forming apparatus function information, the operating system function information representing a function relating to output of device data an operating system and a version thereof, the image forming apparatus function information representing a function relating to output of device data an image forming apparatuses and a version thereof;
a converting unit that converts, at a time when an image forming apparatus is selected by an application on the operating system and print execution is instructed, the function relating to output of the device data of the operating system to correspond to a specific version of an application programming interface so that the converting unit can convert the function relating to output of the device data of the image forming apparatus to correspond to the specific version of the application programming interface stored in the storage; and
a generating unit that generates device data interpretable by the image forming apparatus on the basis of the function converted by the converting unit.

7. The device data generating apparatus according to claim 6 further comprising:
an output unit that outputs the device data generated by the generating unit to the image forming apparatus instructed by a user.

8. A function converting method comprising:
storing correspondence-information between operating system function information and device function information;
converting a function of an operating system to correspond to a specific version of an application programming interface so that a function of an equipment driver corresponds to the specific version of the application programming interface; and
controlling so that the converted function is executed by the equipment driver,
wherein the operating system function information includes a function of an operating system and a type of the operating system, and the device function information includes a function of an equipment driver relating to the function of the operating system and a type of the equipment driver.

9. The function converting method according to claim 8, wherein the operating system function information represents a set of function commands relating to the function and a type of the operating system, and the device function information represents a set of function commands relating to the function and a type of the equipment driver,
the function command of the operating system is converted into the function command of the equipment driver on the basis of the correspondence-information, and the converted function command is transmitted to the equipment driver.

10. The function converting method according to claim 8, wherein the operating system function information includes a function of an operating system and a type of the operating system, and the function of the operating system is utilized by an application operating on the operating system.

11. A storage medium readable by a computer, the storage medium storing a program of instructions executable by the computer to perform an operation, the operation comprising:
storing correspondence-information between operating system function information and device function information;
converting a function of an operating system to correspond to a specific version of an application programming interface so that a function of an equipment driver corresponds to the specific version of the application programming interface; and
controlling so that the converted function is executed by the equipment driver,
wherein the operating system function information includes a function of an operating system and a type of the operating system, and the device function information includes a function of an equipment driver relating to the function of the operating system and a type of the equipment driver.

12. The storage medium according to claim 11, wherein the operating system function information represents a set of function commands relating to the function and a type of the operating system, and the device function information represents a set of function commands relating to the function and a type of the equipment driver,
the function command of the operating system is converted into the function command of the equipment driver on the basis of the correspondence-information, and the converted function command is transmitted to the equipment driver.

13. The storage medium according to claim 11, wherein the operating system function information includes a function and a type of an operating system, and the function of the operating system is utilized by an application operating on the operating system.

14. A storage medium readable by a computer, the storage medium storing a program of instructions executable by the computer to perform an operation, the operation comprising:
storing in advance operating function information representing functions relating to device data of an operating system and a version thereof, and image forming apparatus function information representing functions relating to output of device data of an image forming apparatus and a version thereof, after making correspondences between the operating function information and the image forming apparatus function information;
converting, at a time when an image forming apparatus is selected by an application on the operating system and print execution is instructed, the operating system device data output functions to correspond to a specific version of an application programming interface so that the selected image forming apparatus device data output functions correspond to the specific version of the application programming interface stored in a storage means; and
generating the device data interpretable by the image forming apparatus on the basis of the converted device data output function information.

* * * * *